(12) United States Patent
Ward et al.

(10) Patent No.: US 8,964,340 B2
(45) Date of Patent: Feb. 24, 2015

(54) DEVICE FOR DETECTING A FAULT IN AN AC SUPPLY

(75) Inventors: Patrick Ward, Ballinasloe (IE);
Raymond Legatti, Belleair, FL (US)

(73) Assignee: Shakira Limited, Ballinasloe (IE)

( * ) Notice: Subject to any disclaimer, the term of this patent is extended or adjusted under 35 U.S.C. 154(b) by 34 days.

(21) Appl. No.: 14/006,213

(22) PCT Filed: Mar. 6, 2012

(86) PCT No.: PCT/IB2012/051049
§ 371 (c)(1),
(2), (4) Date: Sep. 19, 2013

(87) PCT Pub. No.: WO2012/131508
PCT Pub. Date: Oct. 4, 2012

(65) Prior Publication Data
US 2014/0009856 A1    Jan. 9, 2014

(30) Foreign Application Priority Data

Mar. 30, 2011    (IE) .................................. S2011/0147

(51) Int. Cl.
*H02H 9/08*    (2006.01)
*H02H 3/16*    (2006.01)
*H02H 3/33*    (2006.01)
*H02H 3/44*    (2006.01)

(52) U.S. Cl.
CPC ............... *H02H 3/162* (2013.01); *H02H 3/334* (2013.01); *H02H 3/44* (2013.01)
USPC .......................................................... 361/42

(58) Field of Classification Search
USPC .......................................................... 361/42
See application file for complete search history.

(56) References Cited

U.S. PATENT DOCUMENTS

| | | | |
|---|---|---|---|
| 6,262,871 B1 * | 7/2001 | Nemir et al. ..................... | 361/42 |
| 6,426,634 B1 * | 7/2002 | Clunn et al. .................. | 324/536 |
| 6,807,036 B2 | 10/2004 | Baldwin | |
| 7,864,492 B2 | 1/2011 | Restrepo et al. | |
| 7,916,438 B2 | 3/2011 | Ward | |
| 2008/0002314 A1 | 1/2008 | Batko et al. | |
| 2010/0013491 A1 * | 1/2010 | Hooper et al. ................ | 324/509 |
| 2010/0295568 A1 | 11/2010 | Ostrovsky et al. | |
| 2012/0154972 A1 * | 6/2012 | McMahon et al. ............ | 361/187 |

FOREIGN PATENT DOCUMENTS

GB    2268011 A    12/1993

OTHER PUBLICATIONS

International Search Report for PCT/IB2012/51049, mailed Aug. 16, 2012, 1 page.

* cited by examiner

*Primary Examiner* — Scott Bauer
(74) *Attorney, Agent, or Firm* — Withrow & Terranova, P.L.L.C.

(57) ABSTRACT

A device for detecting a fault in an AC supply comprises a circuit (CT, 100) for detecting a fault in an AC supply to a load (LD) and providing a corresponding output (IO), and an electromechanical switch means (SOL1, SW1) to disconnect the load from the supply if said output persists for at least a certain period of time. The device includes a generator (30) of intermittent test pulses each simulating a fault. In certain embodiments the duration of each test pulse is less than said certain period of time, and the circuit includes means (D2) for providing a visual and/or audible indication in response to the detection of test pulses by the detecting circuit.

22 Claims, 11 Drawing Sheets

US 8,964,340 B2

DEVICE FOR DETECTING A FAULT IN AN AC SUPPLY

This application is a 35 USC 371 national phase filing of PCT/IB2012/051049 filed Mar. 6, 2012, which claims priority to Irish national application S2011/0147 filed Mar. 30, 2011, the disclosures of which are incorporated herein by reference in their entireties.

FIELD OF THE DISCLOSURE

This invention relates to devices for detecting a fault in an AC supply, for example residual current devices (RCDs) and arc fault detectors (AFDs).

BACKGROUND

Residual current devices, which are also referred to as ground fault circuit interrupters (GFCIs), have been in use worldwide for over forty years, and these devices have contributed significantly to the reduction in fatal accidents arising from electric shock. The principle of operation of RCDs will be well known to those versed in the art, but detailed information can be found in the article "Demystifying RCDs", at www.rcd.ie, which is incorporated herein by reference in its entirety.

RCDs are fitted with a test button to enable the user to verify the correct operation of the device, but users cannot be relied upon to carry out such testing. Furthermore, such testing may be carried out at intervals of many months, and a faulty device could therefore go undetected for long periods during which time the RCD may be required to operate and may not be able to do so.

SUMMARY

An object of the invention is to provide an RCD which incorporates self-test circuitry to indicate to the user whether or not the RCD is capable of performing its protective function.

According to the present invention there is provided a device for detecting a fault in an AC supply, comprising a circuit (CT, 100) for detecting a fault in an AC supply to a load (LD) and providing a corresponding output, means (SOL1 or RLA) to disconnect the load from the supply if said output persists for at least a certain period of time, a generator (30) of intermittent test pulses each simulating a fault, the duration of each test pulse being less than said certain period of time, and means (D2) for providing a visual and/or audible indication in response to the detection of test pulses by the detecting circuit.

In certain embodiments (FIGS. 1-5, 7-9) the indication may be the momentary lighting or sounding of a normally-off light emitting or sound emitting device in response to the detection of each test pulse, whereas in others (FIG. 6) the indication may be the momentary turning off of a normally-on light emitting or sound emitting device in response to the detection of each test pulse.

From another aspect the invention provides a device for detecting a fault in an AC supply, comprising a circuit (CT, 100) for detecting a fault in an AC supply to a load (LD) and providing a corresponding output, means (SOL1 or RLA) to disconnect the load from the supply if said output persists for at least a certain period of time, and a generator (30) of intermittent test pulses each simulating a fault, the duration of each test pulse being less than said certain period of time, said disconnect means being arranged to disconnect the load if said detecting circuit fails to provide an output in response to said test pulses.

From a still further aspect the invention provides a residual current device (RCD) comprising a circuit (CT1, 100) for detecting a differential current in an AC supply to a load (LD) arising from a residual current fault and providing a corresponding output (10), an electromechanical switch comprising a coil (SOL1) controlling a set of contacts (SW1) in the AC supply to the load, the load contacts (SW1) normally being maintained closed in the absence of a residual current fault, an output (10) from the detecting circuit (CT1, 100) sufficiently changing the current flow in the coil (SOL1) to cause the load contacts (SW1) to open, and a generator (Q3, R6-R8, C2, C4) of intermittent test pulses each supplied to the detecting circuit (CT1, 100) for generating a differential current simulating a residual current fault such that the detecting circuit (CT1, 100) provides an output (10) in respect of each test pulse, wherein the device includes means operative in respect of each test pulse to prevent said output (10) causing a sufficient change in the current flowing in the coil (SOL1) so that the load contacts (SW1) are maintained closed in respect of the test pulse.

The fault to be detected may be a residual current fault or an arc fault.

BRIEF DESCRIPTION OF THE DRAWING FIGURES

Embodiments of the invention will now be described, by way of example, with reference to the accompanying drawings, in which.

DETAILED DESCRIPTION

Figure 1:
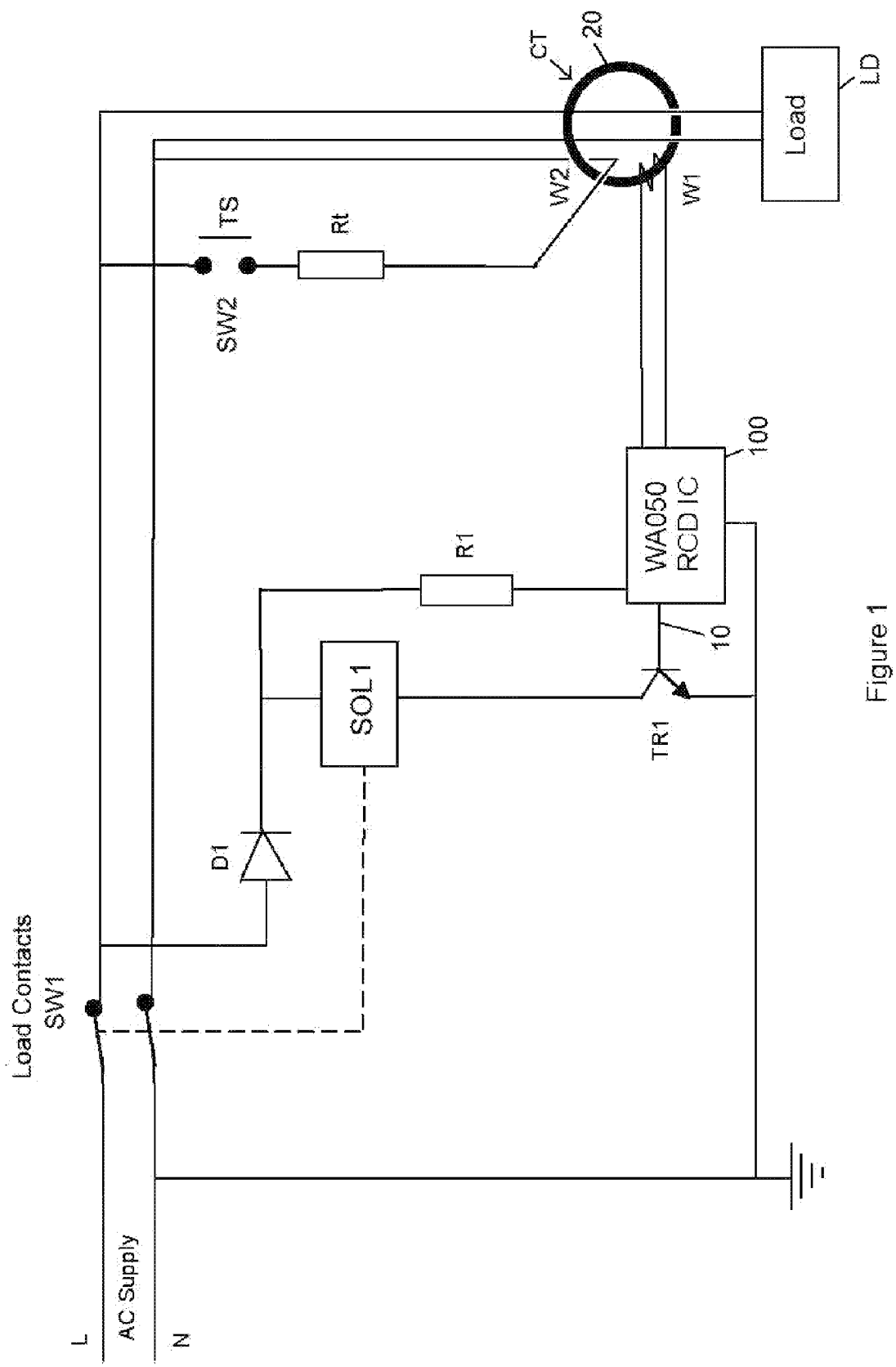
FIG. 1 is a circuit diagram of an RCD with a test function according to the prior art.

FIG. 1 shows, in simplified form, a typical mechanically latched (ML) type RCD according to the prior art. The live and neutral conductors L, N of an AC mains supply pass through the toroidal core 20 of a current transformer CT en route to a load LD and form the primary windings of the CT (the term "winding" is used in accordance with conventional terminology even though the conductors pass directly through the core rather than being wound on it). The output of the current transformer, which appears across a secondary winding W1, is fed to an RCD integrated circuit (IC) 100, which may be a type WA050 supplied by Western Automation Research & Development and described in U.S. Pat. No. 7,068,047. The IC 100 is supplied with power via a diode D1 and resistor R1.

In the absence of a ground fault (residual) current, the vector sum of the currents flowing through the core 20 will be zero since the currents flowing in the L and N supply conductors will be equal and opposite; thus the voltage developed across W1 will be zero. The function of the CT and IC 100 is to detect a differential current (i.e. a non-zero vector sum of currents) flowing through the CT core 20 having a magnitude above a predetermined threshold, such threshold corresponding to a particular level of residual current to be detected according to the desired sensitivity of the RCD. When such a differential current is detected the IC 100 provides a high output voltage on line 10 indicating that a residual current fault has been detected, such voltage being sufficient to turn on a normally-off bipolar switching transistor TR1.

The mains supply is fed to the load LD via a pair of load contacts SW1, controlled by a solenoid coil SOL1. In this embodiment the load contacts SW1 are normally mechanically latched closed but can be opened by a sufficiently high current flowing through an associated solenoid SOL1. As stated, if there is a differential current flowing through the CT core having a magnitude above a predetermined threshold, the IC 100 will produce an output on line 10 which will turn on TR1. This will allow supply current to flow through the solenoid SOL1 which will open its mechanically latched contacts SW1 and remove power to the load LD.

The RCD also includes a test switch comprising a manually operable test button TS which, when pressed, bridges normally-open contacts SW2. Pressing the test button TS diverts a portion of the supply current through a further winding W2 on the core 20, via a resistor Rt (in this case W2 is a single conductor which passes straight through the core 20, the term "winding" again being used in accordance with conventional terminology). The current diverted through the core 20 will produce a differential current (i.e. a non-zero vector sum of currents) flowing through the CT core 20, and the magnitude of the diverted current is selected such that the differential current is above the predetermined threshold, thus simulating a residual current fault. Accordingly, provided the RCD is operating correctly, the CT winding W1 will produce an output which will be detected by the IC 100 which will, in turn, produce an output on line 10 to turn on TR1 and energize the solenoid and open the contacts just as in the case of an actual residual current fault. Windings W1 and W2 may be separate windings or formed from a bifilar winding.

Figure 2:
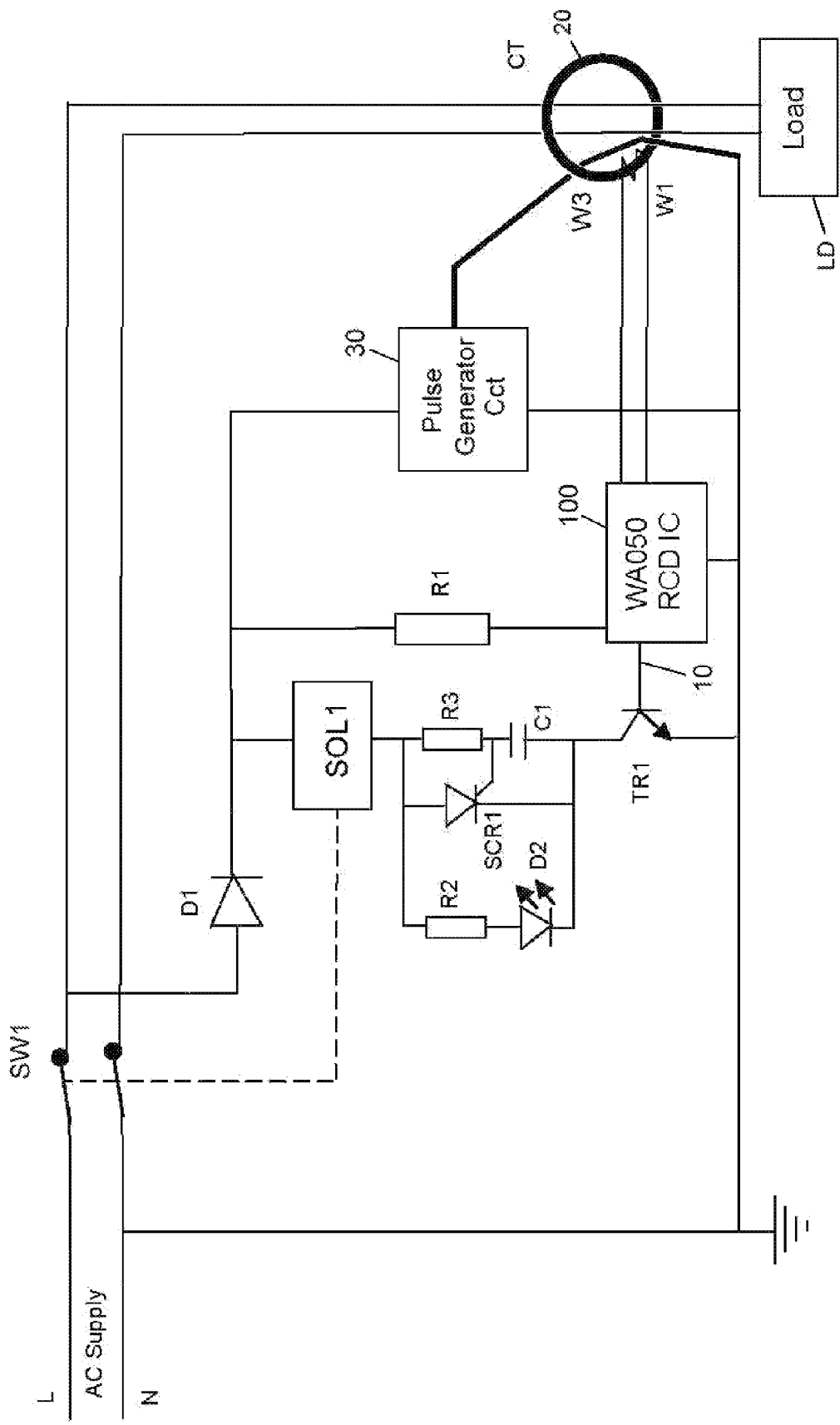
FIGS. 2 to 11 are circuit diagrams of first to tenth embodiments of the invention.

Verification of the correct operation of the RCD requires the user to operate the test button, but there could be intervals of several months between such testing, and if the RCD becomes inoperable in the interval, the user will have no way of knowing that the RCD is no longer capable of providing protection. FIG. 2 shows an arrangement for automatic self-testing of the RCD on a continuous basis, and means to alert the user to the possible failure of the RCD.

FIG. 2 comprises substantially the same circuitry as FIG. 1, with the addition of a pulse generating circuit 30, a further winding W3 on the CT core 20, a capacitor C1, resistors R2 and R3, a diode D2 and a silicon controlled rectifier SCR1. R2 and D2 form a first circuit branch in series with the solenoid coil SOL1, and SCR1 forms a second circuit branch also in series with the solenoid SOL1 and in parallel with the first circuit branch. The manual test circuitry TS, SW2, Rt and W2 of FIG. 1 has been omitted for simplicity.

The pulse generator 30, which is powered via the diode D1, generates a continuous stream of relatively short duration test pulses at regular intervals, and during the period of each pulse a current will flow through the CT winding W3, causing a corresponding short duration differential current to flow through the core 20 of the current transformer. The amplitude of the test pulses is sufficiently high that the differential current caused thereby has a magnitude above the predetermined threshold and therefore sufficient for detection by the IC 100 as a residual current fault and consequent generation of an output on line 10. This will cause TR1 to turn on momentarily for the duration of each test pulse. When TR1 turns on it will draw a current through both the solenoid SOL1 and also through R2 and D2 in series therewith. Resistor R2 has a value large enough to limit the current through the solenoid SOL1 to a level insufficient to open the contacts SW1 during each short duration test pulse. Diode D2 is a light emitting diode (LED) which will be lit momentarily each time TR1 is turned on by the detection of a test pulse by the IC 100. Thus on the occurrence of each test pulse, the circuit will detect a simulated residual current fault and verify its correct operation by lighting the LED D2, which will flash on and off at regular intervals during correct operation of the device.

In addition, each time TR1 is turned on by the detection of a test pulse by the IC 100, the capacitor C1 will charge up via R3. However, the duration of each test pulse is insufficient to allow the voltage on C1, which is applied to the gate of the normally-off silicon controlled rectifier SCR1, to build up to a level high enough to turn SCR1 on. Between test pulses (i.e. during periods when TR1 is off) the capacitor C1 will discharge, either by inherent charge leakage in the circuit or via a bleed resistor (not shown) placed across C1.

However, in the event of a sustained actual or simulated residual current fault arising under an actual fault condition or on operation of the manual test circuit, TR1 will remain turned on for the duration of the residual current fault which will be substantially longer than the duration of a test pulse. In this case C1 will charge up via R3 and ultimately the voltage on C1 will increase to a level at which the normally-off SCR1 will be turned on. This will provide a low impedance path for current flow through the solenoid SOL1 to activate the solenoid.

The described circuit simulates an actual residual current fault and continuously checks key operating components of the RCD circuit, such as SOL1, D1, W1, W2, WA050, TR1, etc.

Figure 3:
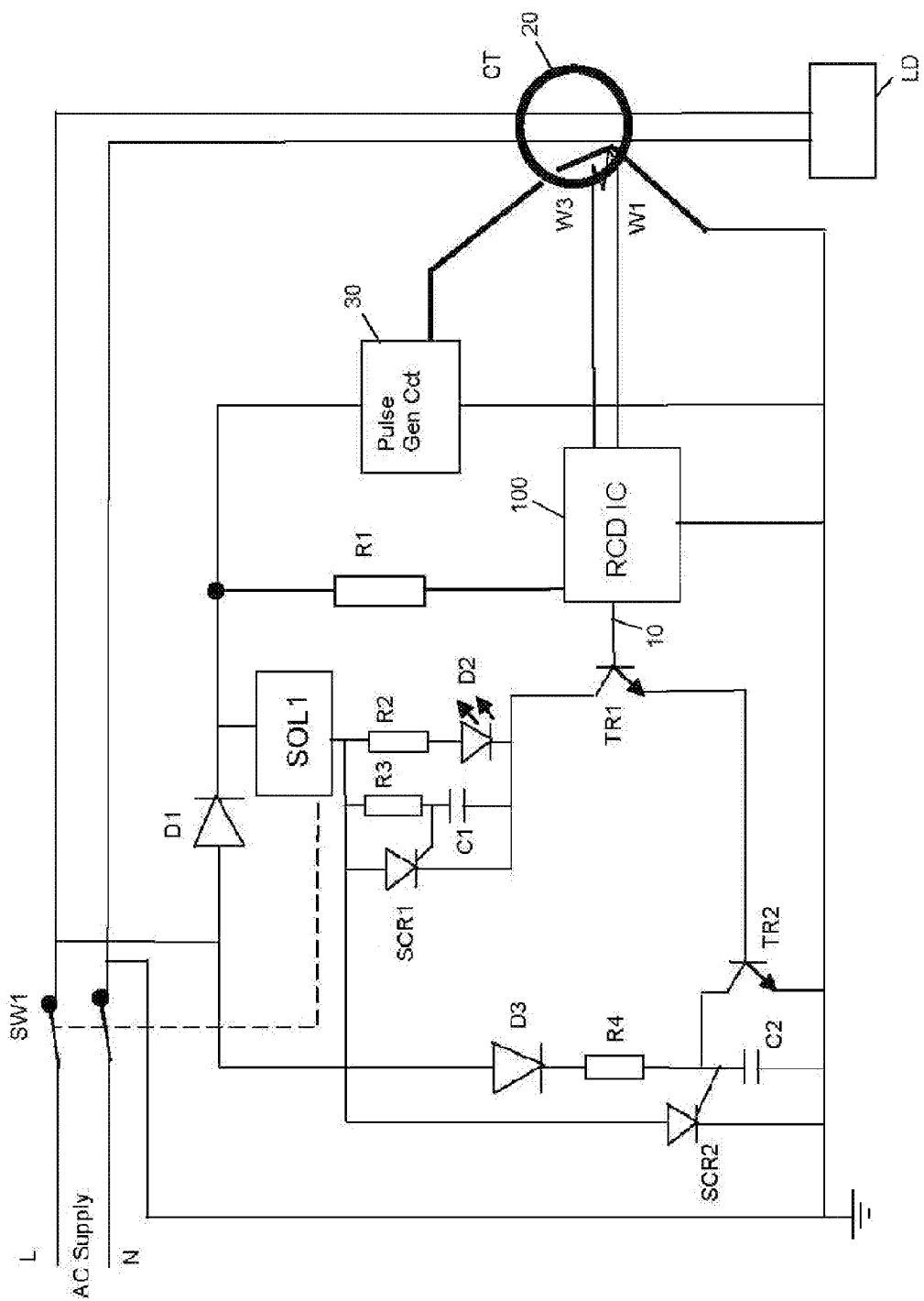

Whilst the addition of a self test circuit is a valuable feature, the RCD may be installed in an area which is not readily accessible, for example in a switchboard or a panel, in which case the audible or visual indicator may not be noticed. It would therefore be advantageous to automatically alert the user to failure of the RCD. FIG. 3 shows such an arrangement, based on the embodiment of FIG. 2.

FIG. 3 shows the same circuit as FIG. 2 with the addition of the following end-of-life (EOL) components: diode D3, resistor R4, silicon controlled rectifier SCR2, capacitor C2 and bipolar transistor TR2. Under normal conditions, after the application of power to the device, capacitor C2 will start to charge up via R4 and D3. The voltage on C2 is applied to the gate of the normally-off SCR2, so that if the voltage on C2 rises high enough SCR2 will turn on. However, as described above, TR1 will conduct momentarily for the duration of each test pulse and since the emitter of TR1 is connected to the base of TR2 this will cause TR2 also to turn on momentarily during each test pulse. This will discharge any charge on C2 which has built up since the last time TR2 was momentarily turned on. Thus under normal operating conditions C2 will not acquire a sufficient voltage to cause SCR2 to turn on.

However, if, due to a fault, TR1 does not conduct in response to test pulses then TR2 will remain off. Eventually, therefore, the voltage on C2 will reach a level sufficient to turn on SCR2. This will provide a low impedance path for current flow through the solenoid SOL1 to activate the solenoid and open the contacts SW1. If the contacts SW1 are manually reclosed and SCR2 is not prevented from turning on by the self test arrangement, the device will automatically re-open and continue to do so on each reclosing. In addition to providing automatic end of life shutdown or disabling of the RCD in the event of failure of key components of the RCD, this arrangement also verifies the correct operation of key components of the self test circuit and defaults to end of life mode in the event of failure of the RCD or the self test circuitry.

The solenoid energisation current will flow through SCR1, TR1 and the base of TR2, but if this current is relatively large TR2 may be over-stressed. This problem can be overcome by the arrangement of FIG. 4.

Figure 4:
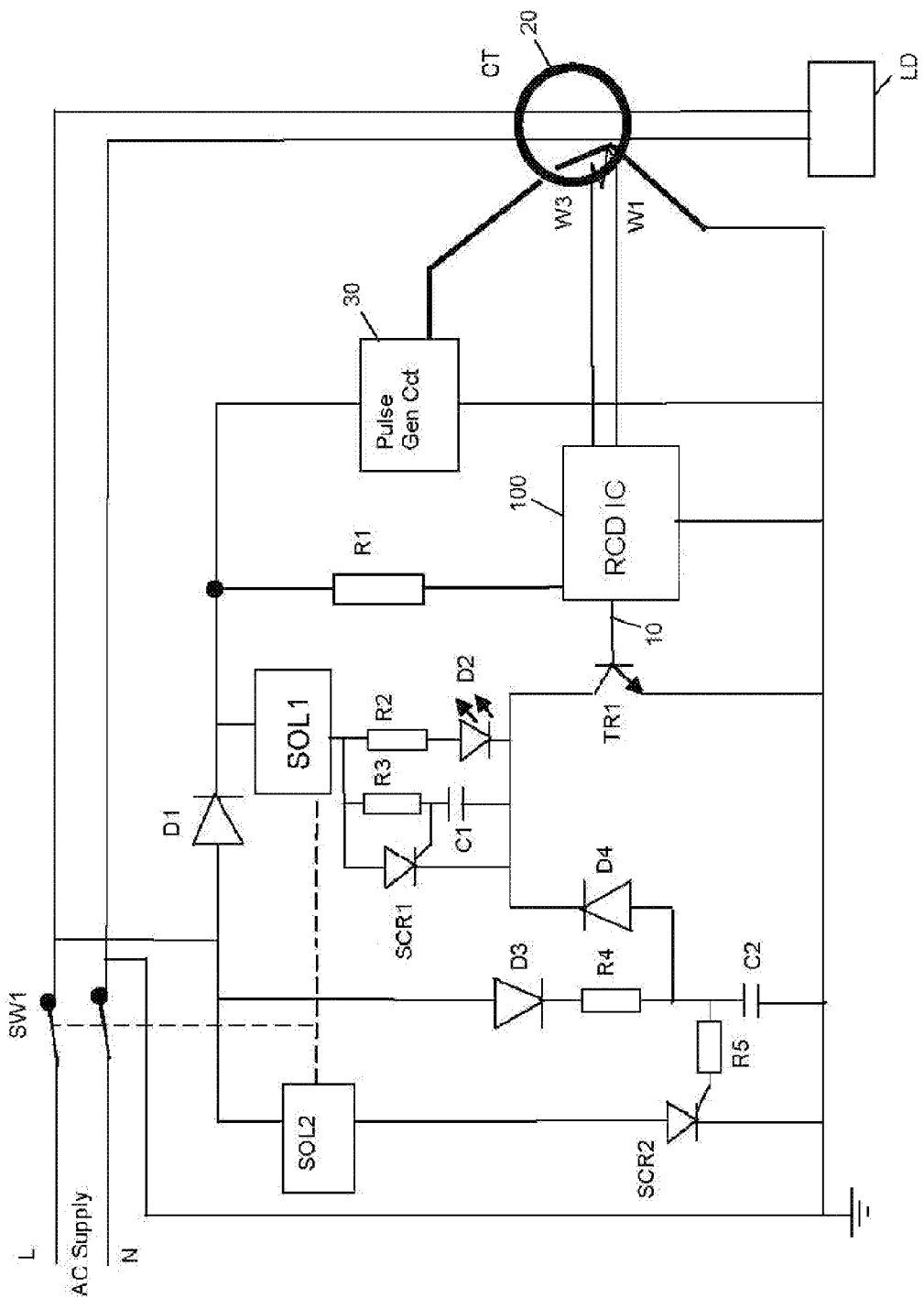

In FIG. 4, C2 charges up via R4 and D3 as before. However, TR2 is omitted and diode D4 provides a path to discharge C2 via transistor TR1 on the occurrence of each self test pulse. Resistor R5 provides more control over the turn on threshold for SCR2. Resistor R5 may be replaced by a diac to provide more precise control of SCR2 turn on.

To provide security against the failure of the main solenoid coil SOL1, a second solenoid coil SOL2 has been added which can operate the contacts SW1 independently of SOL1. Thus if SOL1 fails, SOL2 will be activated by SCR2. The two solenoids SOL1 and SOL2 may be disposed on a common former. However, if desired, SOL2 could be omitted and SCR2 used to activate SOL1 as in FIG. 3.

A key benefit of the EOL circuitry is that it not only verifies the correct operation of the RCD circuitry, but also verifies the self testing circuitry because if the self testing pulses cease to flow the RCD will auto trip as described. In the arrangement of FIG. 4 the EOL feature will be activated in the event of failure of key components including but not limited to the CT and its windings, the RCD IC 100, R1, R2, SOL1, D1, D2, TR1 and the pulse generating circuitry 30, etc. An additional advantage of this end of life circuit is that if SCR2 turns on inadvertently, for example due to noise or a voltage surge on the mains supply, the user will be able to reclose the RCD and if it remains closed there will be an immediate indication of normality because power will be restored to the load and D2 will light up on the occurrence of each test pulse as before. On the other hand, if the RCD or the self test circuitry has developed a fault, the RCD will auto trip each time it is reclosed and thereby force the user to replace the RCD.

Figure 5:
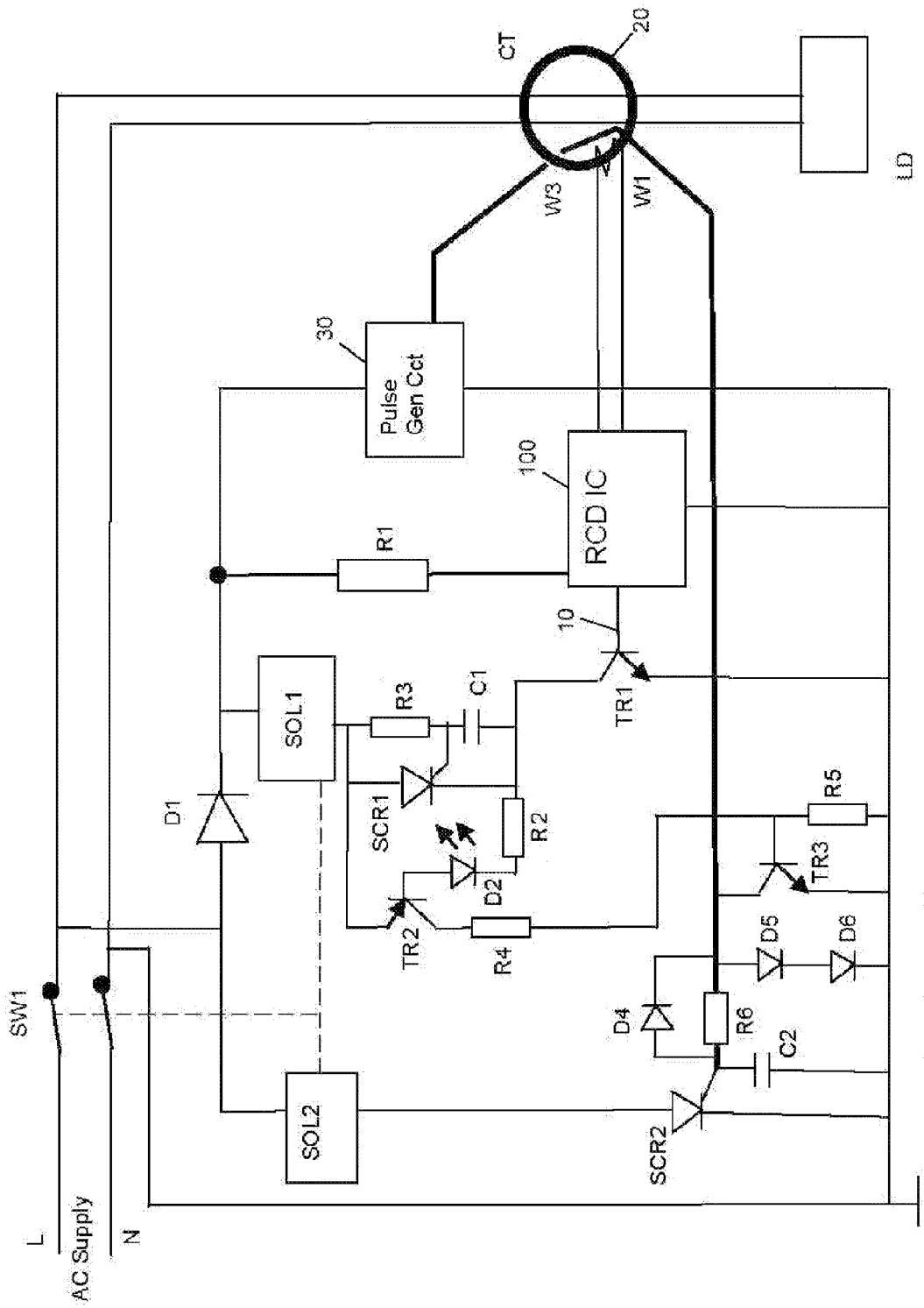

For reasons of safety, failure of the RCD will merit automatic disabling of the device. However, in cases where continuity of supply is also important, it may be desirable to avoid end of life operation in the event of failure of the self test circuit alone and to only allow EOL operation in the event of failure of the RCD circuitry. FIG. 5 shows an arrangement whereby this option can be facilitated.

In the arrangement of FIG. 5, which is a modification of FIG. 4, the test pulses produced by the pulse generator 30 are used to directly charge up the capacitor C2 via the resistor R6. After a predetermined time, set by the values of C2 and R6, the voltage on C2 will rise to a value sufficient to turn SCR2 on and activate SOL2, which will automatically open the load contacts SW1 (diodes D5 and D6 are used to clamp the test circuit pulses to a certain level). Each test pulse will be detected by the IC 100 via winding W1 and will cause TR1 to turn on momentarily as previously described. The bipolar switching transistor TR2 will be turned on momentarily when TR1 conducts, and will feed current via resistor R4 to momentarily turn on a further switching transistor TR3. This latter will, in turn, discharge C2 via diode D4 and prevent SCR2 from turning on. As before, the RCD will not trip solely in response to the short test pulses but will trip in response to a prolonged output on the line 10 from the IC 100.

In this embodiment, as in the preceding embodiments, SCR1 forms the second of the first and second mutually parallel circuit branches in series with the solenoid SOU. However, in this case the first circuit branch also includes the emitter-base path of the transistor TR2, as well as D2 and R2. Nevertheless the result is the same—to indicate correct operation of the test circuit, the LED D2 will flash momentarily each time a test pulse turns on TR1, by current flow through the emitter-base path of TR2.

For as long as the test circuit is operational, failure of any part of the main RCD circuit (IC 100, TR1, C1, R2, SCR1) will cause automatic activation of the end of life function since C2 will not be intermittently discharged through TR3 as previously described. However, in the event that the self test circuit itself fails to function the EOL function (which depends on the charging of C2 by the test pulses) will not be activated and the RCD will continue to provide protection for the AC supply as normal.

Figure 6:
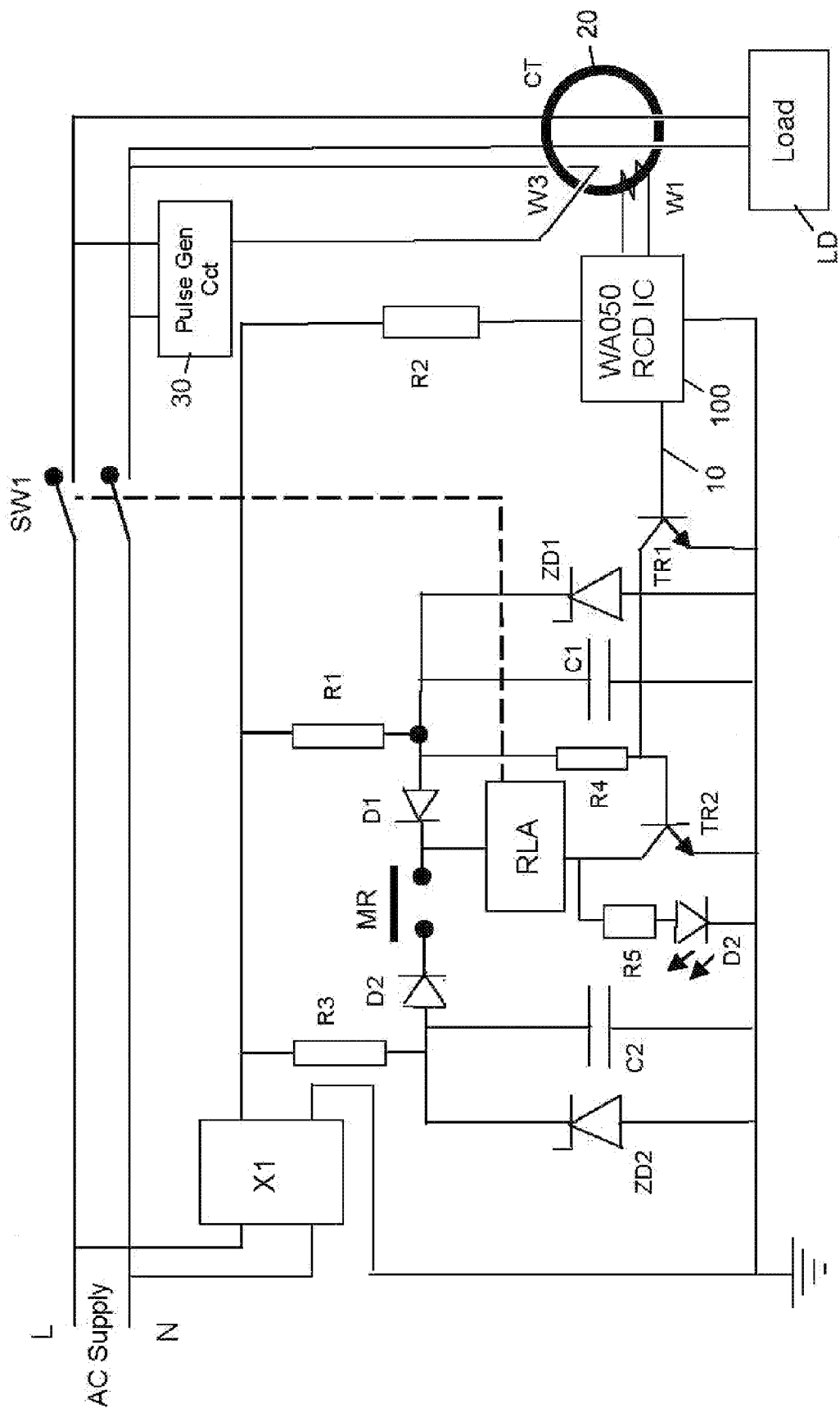

FIG. 6 shows an embodiment of the invention based upon the electrically latching (EL type) RCD circuit described in Irish Patent Application No. S2011/0068 (P100325IE00/cb).

In FIG. 6, an AC mains supply comprising live and neutral conductors L, N is connected to a load LD via normally-open load contacts SW1 controlled by an electromechanical relay RLA. The circuit is supplied with power via a bridge rectifier X1, and the relay is supplied with a DC current. The RCD circuit is built around an RCD integrated circuit (IC) 100, which may be a type WA050 supplied by Western Automation Research & Development, supplied with current via a resistor R2.

The relay RLA is known as an electrically latching relay because it needs a constant current flow through a solenoid coil forming part of the relay to maintain the contacts SW1 in the closed position. Thus when a current of sufficient magnitude (known as the closing current) is passed through the coil the resultant magnetic flux causes the load contacts SW1 to close. Thereafter, the load contacts will remain closed provided a minimum holding current, less than the closing current, continues to flow through the relay coil. However, should the current flowing in the relay coil fall below the holding current the load contacts SW1 will automatically open and can then only be re-closed manually (if a manual reset, not shown, is provided) or by increasing the magnitude of the current through the relay at least to the closing current. This relay design is simple and well proven.

The live and neutral conductors L, N pass through the toroidal core 20 of a current transformer CT en route to the load. The output of the current transformer, which appears across a secondary winding W1, is fed to the IC 100. In the absence of a ground fault (residual) current, the vector sum of the currents flowing through the core 20 will be zero since the currents flowing in the L and N supply conductors will be equal and opposite; thus the voltage developed across W1 will be zero. The function of the CT and IC 100 is to detect a differential current flowing through the CT core 20 having a magnitude above a predetermined threshold, such threshold corresponding to a particular level of residual current to be detected according to the desired sensitivity of the RCD. When such a differential current is detected the IC 100 provides a high output voltage on line 10 sufficient to turn on a switching transistor TR1.

In FIG. 6 a resistor R1 and a diode D1 provide current to the relay RLA coil via the bridge rectifier X1. A capacitor C1 smoothes the voltage across the relay RLA to prevent chatter. A Zener diode ZD1 limits the voltage to a specified maximum level. For supply voltages at or above a minimum operating voltage of the RCD, C1 will acquire a charge which will be at or above a voltage sufficient to provide a holding current through the relay RLA but insufficient to provide a closing current through the relay RLA.

Transistor TR2 will be turned on via resistor R1 and R4 to provide this current path through RLA and a current of sufficient magnitude will therefore flow continuously through RLA coil to enable the contacts SW1 to remain closed once they have closed. A capacitor C2 will acquire a charge via a resistor R3, and for supply voltages at or above the minimum operating voltage of the RCD, C2 will acquire a charge which will be at or above a voltage sufficient to provide a closing current through the relay RLA, although clamped by a Zener diode ZD2 at a safe level. The charge on C2 is supplied via the resistor R3, but this current flow is limited to a relatively low value so as to minimise power dissipation in R3. When a reset button MR is closed by manual means, the voltage on C2 will be applied to the RLA coil and the momentary application of this higher voltage will cause the relay RLA to close its contacts SW1. The voltage applied from C2 will quickly collapse but RLA will be held in the closed state by the holding current supplied via R1 and C1.

In the event of a residual current fault, as evidenced by an output on line 10 of the IC 100, the transistor TR1 will be turned on and remove the base current from TR2 and cause TR2 to turn off. The resultant reduction in RLA current to a level below its holding current will cause the load contacts SW1 to open and remove power to the load LD. TR1 will turn off and C1 will charge up to its previous voltage and TR2 will turn on again, but RLA will not automatically reclose until the reset button MR is closed again.

FIG. 6 includes automatic self-test circuitry similar to that of FIG. 2, comprising pulse generator 30, winding W3, resistor R5 and light emitting diode D2. R5 and D2 form a first circuit branch in series with the relay RLA, and TR2 forms a second circuit branch also in series with the relay and in parallel with the first circuit branch. For convenience, manual test circuitry corresponding to TS, SW2, Rt and W2 of FIG. 1 has been omitted for simplicity.

The pulse generator 30 generates a continuous stream of relatively short duration test pulses at regular intervals, and during the period of each pulse a current will flow through the CT winding W3, causing a corresponding short duration differential current to flow through the core 20 of the current transformer. The amplitude of the test pulses is sufficiently high that the differential current caused thereby has a magnitude sufficient for detection by the IC 100 as a residual current fault and consequent generation of an output on line 10. This will cause TR1 to turn on for the duration of each test pulse, as before.

Turning TR1 on will in turn cause TR2 to turn off. The current flow through RLA will then be diverted through D2 and R5, causing D2 to light up. On expiration of the test pulse TR1 will turn off and TR2 will turn on again, restoring the full current flow through RLA. When TR2 is turned off, the resultant current flow through RLA will be less than its holding current, so opening of RLA will be initiated. However, due to the inherent magnetic hysteresis in the relay RLA its contacts SW1 will not open immediately when TR2 is turned off but only after a certain response time. By ensuring that the duration of the test pulses is shorter than the response time of the relay RLA, the period during which RLA holding current is reduced will be correspondingly short such that the contacts SW1 will not be opened and no interruption in the supply to the load LD will occur. However in the event of a sustained output on the line 10 from the IC 100, due to a sustained residual current fault or operation of the manual test circuit, TR2 will remain turned off for a much longer period, longer than the response time of the relay RLA, and the load contacts SW1 will open.

If the RCD fails at any time the user will notice that the diode D2 is not flashing at regular intervals as normal and will be inclined to operate the test button and verify the non functioning of the RCD.

Figure 7:
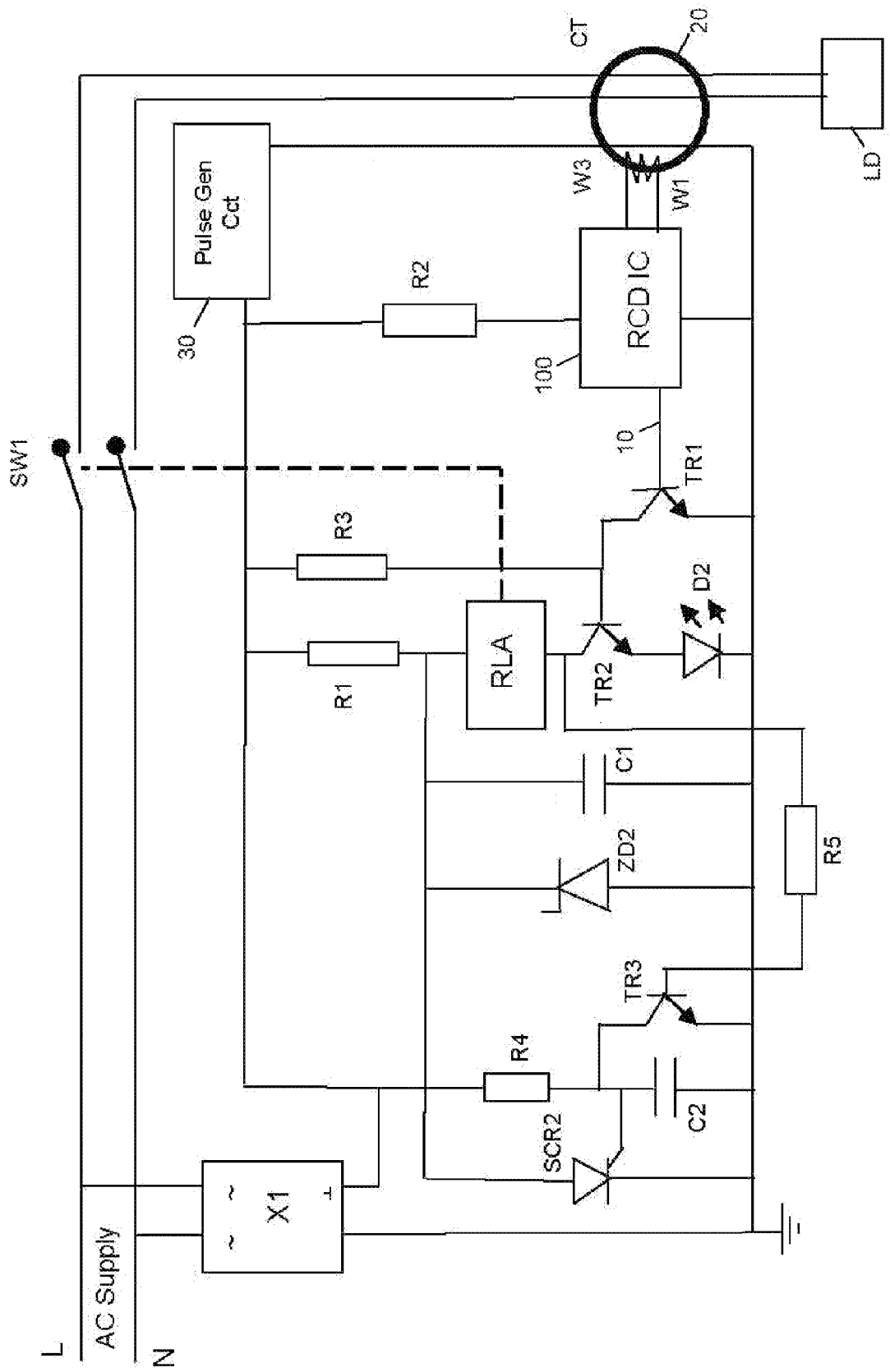

FIG. 7 shows another example of how the self test and end of life circuitry can be incorporated into an electrically latching (EL) RCD.

In the arrangement of FIG. 7 resistor R1 provides a supply to normally-open relay RLA, which may be the same type as the relay of FIG. 6. Capacitor C1 smoothes the DC supply from bridge rectifier X1 and zener diode ZD2 clamps the relay voltage to a safe operating level. Transistor TR2 is normally held in the on condition by a current supply via resistor R3. The relay contacts SW1 are initially latched by manual means (not shown) to enable power supply to the load LD. SW1 will then remain closed by a holding current through RLA supplied via R1 and TR2. Under a residual current fault condition the RCD IC 100 will turn on TR1 as previously described. This in turn will cause TR2 to turn off and the relay RLA will de-energize and its contacts SW1 will open and disconnect the load LD. The RCD load contacts SW1 can only be reclosed by manual means.

The self testing circuitry comprises the pulse generator circuit 30 which provides a stream of short duration pulses at regular intervals through the CT via winding W3. These pulses are detected by the RCD IC 100 and cause TR1 to turn on. TR2 turns off as previously described, but in this case the off period is very short and although RLA is momentarily de-energized, it requires a period of 1-2 msec for its contacts to open. By the time RLA contacts SW1 start to open, TR1 turns off and TR2 turns on again due to the short duration of the test pulse and the voltage on C1 is instantly re-applied to RLA and prevents its contacts SW1 from opening. As before, the diode D2 is an LED which is lit when TR2 is on. Thus the flashing LED will indicate that the self testing circuit is operational. In this case, however, the LED D2 flashes on in the periods between test pulses, and turns off momentarily during the occurrence of each test pulse, the opposite of the other embodiments.

EL type RCDs have certain inherent failsafe features in that failure of certain key components will cause the relay RLA to automatically open its contacts SW1. For example, in the case of FIG. 7, failure of X1, R1, RLA coil or TR2 will activate the fail safe mode by causing the contacts to open and the user will be alerted. Nonetheless, some component failures could occur which would disable the RCD protection function without the user being alerted, and to some extent the self test circuit will provide indication of such a failure. However, it can be advantageous to disable the RCD in the event of an end of life (EOL) failure condition.

The EOL circuitry comprises the silicon controlled rectifier SCR2, capacitor C2, switching transistor TR3, and resistors R4 and R5. When power is applied to the RCD circuit, capacitor C2 will start to charge up via R4 and should the voltage on C2 reach a certain level, SCR2 will turn on and will effectively short out the relay RLA coil and de-energize it. However, the test pulses that cause TR1 to turn on momentarily and TR2 to turn off momentarily will also cause TR3 to be turned on momentarily by the rise in voltage at the collector of TR2 which is fed to the base of TR3 via R5. This causes C2 to discharge via TR3 and thereby the voltage on C2 does not rise high enough to turn SCR2 on. However, in the event of TR2 failing to turn off within a predetermined time, the voltage on C2 will rise sufficiently to turn SCR1 on and disable the relay RLA. The circuit can be reset by removing power from the supply side of the RCD, but if the failure mode persists, the relay RLA will be automatically disabled again.

Figure 8:
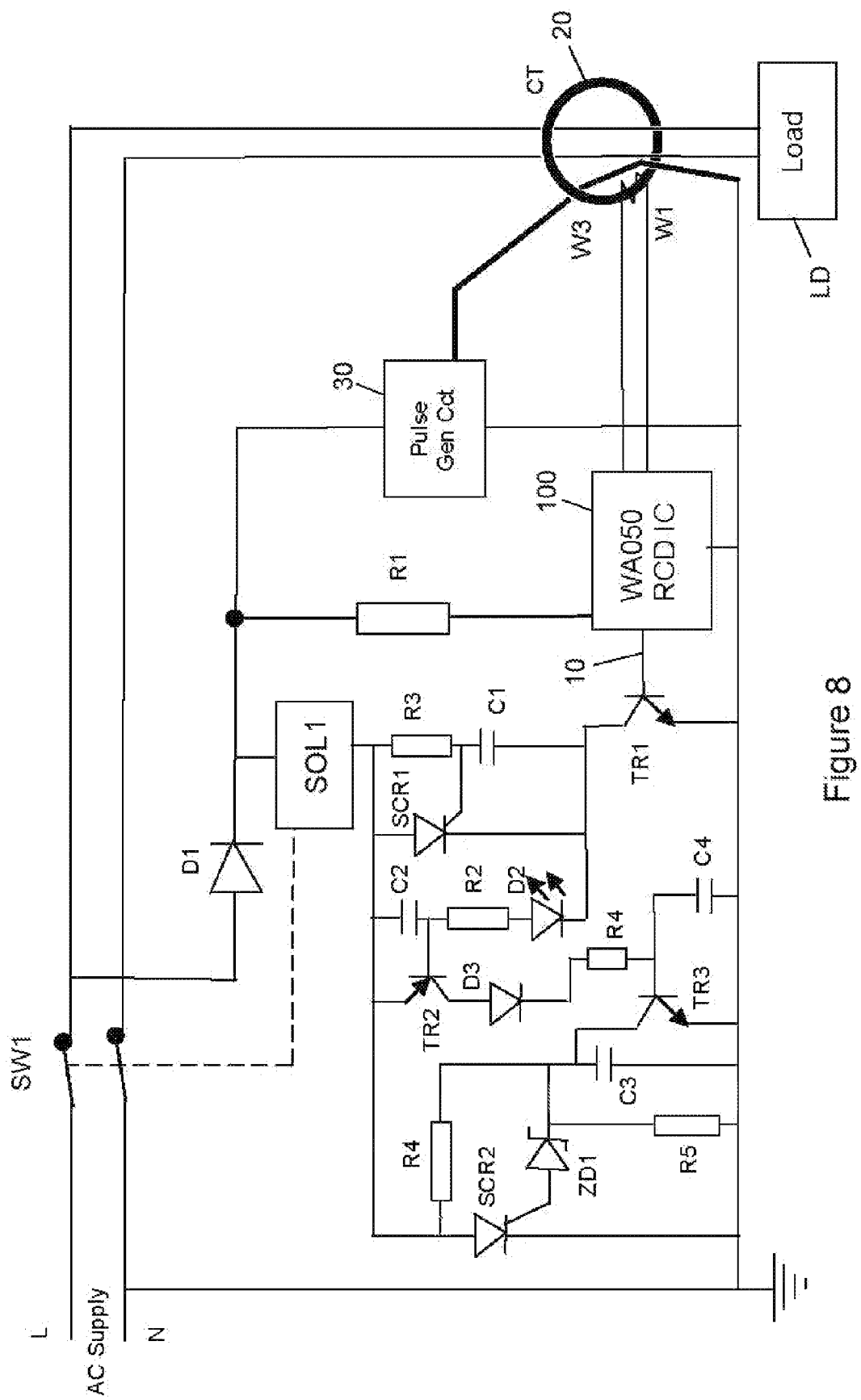

FIG. 8 shows a further embodiment which is a modification of FIG. 2.

In the arrangement of FIG. 8, a capacitor C2 has been placed in series with R2 and D2, but in all other respects the auto testing circuit operates as previously described for FIG. 2. Each time a pulse flows through C2, TR2 is turned on for the pulse duration. This in turn causes a pulse of current to flow into capacitor C4 via D3 and R4. The charge on C4 keeps transistor TR3 turned on for a duration longer than the test pulse, and as long as TR3 is turned on, SCR2 gate will be held low and prevented from turning on. In the event that the auto test pulses do not flow in the circuit for any reason TR2 will not conduct and TR3 will turn off and remain off. SCR2 gate will then be pulled high via R4 with a time delay based on the time constant of R4 and C3. Once the charge on C3 exceeds ZD1 breakover voltage SCR2 will turn on and activate the solenoid. The time constant of R4/C3 is critical in ensuring that SCR2 does not turn on prematurely. It follows that the arrangement of FIG. 8 provides for auto testing of the RCD on a continuous basis, and in the event of failure of the RCD itself or the auto test circuit, the RCD will automatically trip and prevent its further use.

Figure 9:
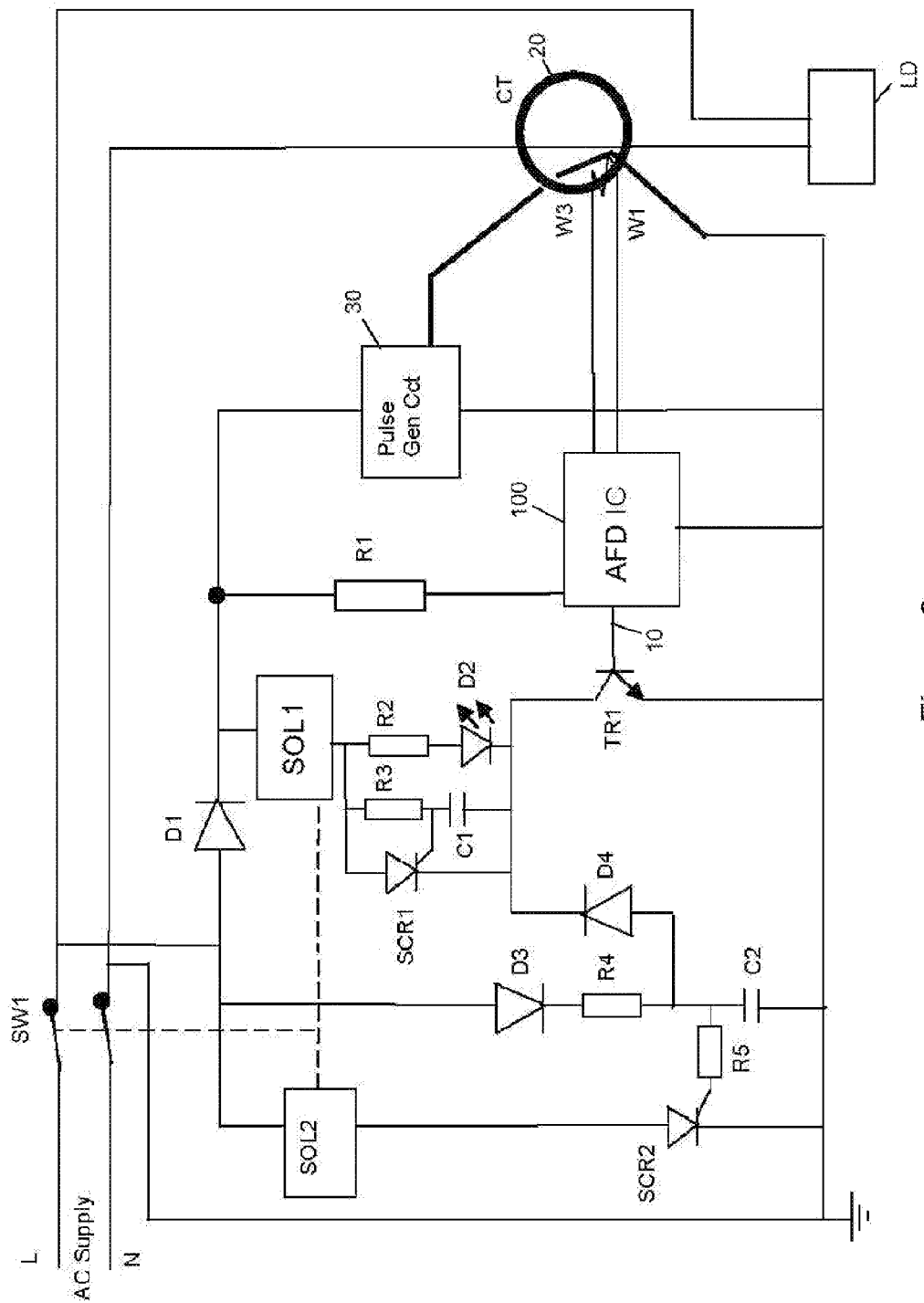

The self test and end of life circuitry previously described can also be incorporated into an arc fault detector (AFD) as shown in FIG. 9, which is a modification of the circuit of FIG. 4.

In this embodiment, for the detection of arc faults, the current transformer CT has its core 20 surrounding just one of the supply conductors, in this case the live conductor L. The design of the CT is such that it has minimal response to slowly rising or sustained load currents at the mains supply frequency but is highly responsive to current pulses with very fast rise times which would be generated by arcing.

Arc fault current pulses in the live conductor L induce voltage spikes across the secondary winding W1. When these are above a certain threshold and/or persist for longer than a certain period of time the IC 100, here configured as an arc detector, will produce an output on the line 10 to turn on TR1. This triggers the circuit to open the load contacts SW1, as described for FIG. 4.

In this case each test pulse produced by the pulse generator 30 comprises a short burst of high frequency oscillations with very fast rise times similar to those that would be generated by arcing. These test pulses (bursts) are designed to produce a differential current in the CT having characteristics which simulate the differential current produced by an actual arc fault (actually, due to the live conductor L passing though the core 20, there will always be a non-zero vector sum of currents flowing through the CT, but the characteristics of the detection circuitry are designed not to respond to it). Each burst will be detected by the winding W1 and fed to the IC 100 to cause the latter to produce a momentary output on line 10 to turn on TR1. The further operation of the device is as described for FIG. 4.

In the preceding embodiments, a sound emitting device can be used instead of, or in addition to, the light emitting diode D2 to provide an audible indication that the self-test function is operating correctly.

Figure 10:
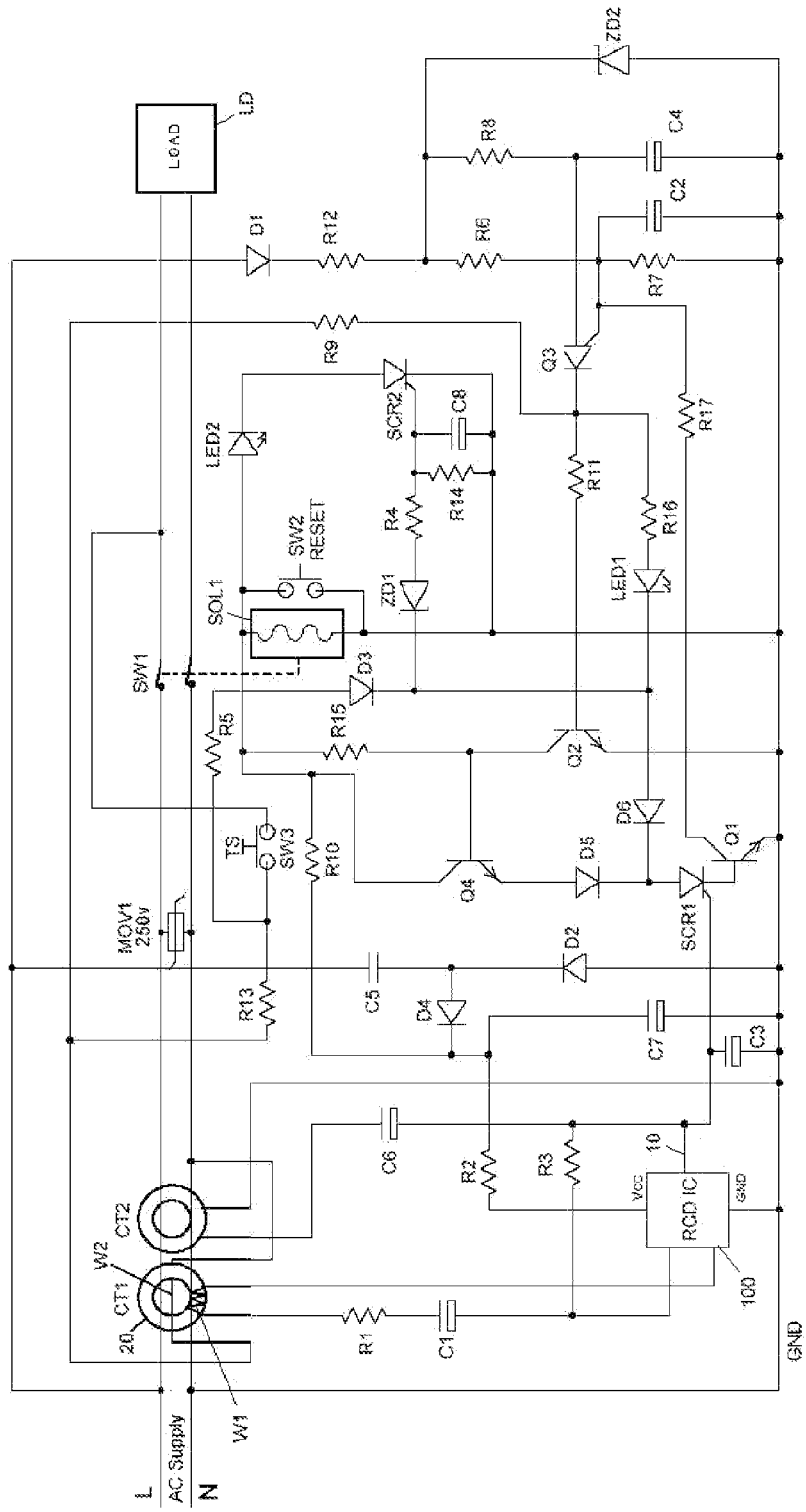

FIG. 10 shows a further embodiment of an electrically latched (EL) type RCD. The live and neutral conductors L, N of an AC mains supply pass through the toroidal core 20 of a current transformer CT1 en route to a load LD. The mains supply is fed to the load LD via a pair of load contacts SW1, controlled by a solenoid coil SOU. The load contacts SW1 are of a type which are maintained closed by the associated solenoid coil SOL1 provided a sufficient current passes through SOU. The combination of the solenoid coil SOL1 and the load contacts SW1 are embodied in an electro-mechanical relay of known type. A metal oxide varistor MOV1 provides overvoltage protection.

The conductors L, N constitute primary windings for the current transformer, the term "winding" being used in accordance with conventional terminology even though the conductors pass directly through the core rather than being wound on it. The output of the current transformer, which appears across a secondary winding W1, is fed via resistor R1 and capacitor C1 to an RCD integrated circuit (IC) 100 which may be a type WA050 supplied by Western Automation Research & Development, Ireland. The circuit is supplied with power from the live L and neutral N conductors, with positive half cycles of the supply flowing via capacitor C5, diode D4, resistor R2 and a voltage regulator within the integrated circuit 100, and negative half cycles flowing via capacitor C5 and diode D2. Capacitor C7 provides smoothing and storage of the rectified supply so that the circuit can operate continuously. C7 also provides power to the solenoid coil SOL1 via resistor R10. In normal operation, i.e. no residual current fault, the voltage on C7 ensures that a current flows through SOL1 which is sufficient to maintain the load contacts SW1 closed.

In the absence of a ground fault (residual) current, the vector sum of the currents flowing through the core 20 will be zero since the currents flowing in the L and N supply conductors will be equal and opposite; thus the voltage developed across W1 will be zero. The function of the CT1 and IC 100 is to detect a differential current (i.e. a non-zero vector sum of currents) flowing through the CT core 20 having a magnitude above a predetermined threshold, such threshold corresponding to a particular level of residual current to be detected according to the desired sensitivity of the RCD.

When such a differential current is detected the IC 100 provides a high output voltage on line 10 indicating that a residual current fault has been detected, such voltage being sufficient to turn on a normally-off silicon controlled rectifier SCR1. The base of a bipolar transistor Q4 will normally be held high by a resistor R15 but Q4 will not be able to conduct until SCR1 turns on. When SCR1 turns on, a low impedance path will be established from the top of SOL1 coil to neutral via Q4, diode D5, SCR1 and the base-emitter path of bipolar transistor Q1, with the result that C7 will discharge through this path via resistor R10. When the voltage on C7 falls below a certain level, the current through SOL1 will fall below a level necessary to maintain the load contacts SW1 closed, i.e. SOL1 is deactivated, so the latter will open automatically to disconnect the load LD and provide protection against the fault. The conduction path of Q4, D5, SCR1 and Q1 will be sustained unless the supply is removed. However, operation of the manual reset button SW2 will short out the conduction path to ground and cause it to cease conduction. Upon release of the reset button the capacitor C7 will charge up as before and cause automatic reclosure of load contacts SW1.

Current transformer CT2 together with capacitor C6 and resistor R3 are used for the detection of a fault between neutral and earth. The operation of this part of the circuit will be obvious to those familiar in the art of RCD operation, and will not be further described.

The RCD also includes a normally open test switch comprising a manually operable test button TS which, when pressed, bridges normally-open contacts SW3. Pressing the test button TS diverts a portion of the supply current through a further winding W2 on the core 20, via a resistor R13 (in this case W2 is a single conductor which passes straight through the core 20 but, as before, the term "winding" is used in accordance with conventional terminology). The current diverted through the core 20 will produce a differential current (i.e. a non-zero vector sum of currents) flowing through the CT core 20, and the magnitude of the diverted current is selected such that the differential current is above the predetermined threshold and thus simulates a residual current fault. Accordingly, provided the RCD is operating correctly, the IC 100 will produce an output on line 10 to turn on SCR1 resulting in opening of the contacts SW1 just as in the case of an actual residual current fault.

Verification of the correct operation of the RCD requires the user to operate the test button, but there could be intervals of several months between such testing, and if the RCD becomes inoperable in the interval, the user will have no way of knowing that the RCD is no longer capable of providing protection.

The above opening and reclosing cycle as described for the operation of the test button will be repeated in the event of the occurrence of a persistent residual current fault.

If SW2 has a stable closed position and a stable open position, it can be moved to the fixed closed position to enable manual opening of the contacts for any length of time, and moved to the open position to enable automatic reclosing of the contacts.

A pulse generating circuit is supplied with power via diode D1 and resistor R12, the pulse generating circuit comprising unijunction transistor Q3, resistors R6, R7, R8, and capacitors C2 and C4. Q3 produces a continuous stream of test pulses which are fed via resistor R9 and winding W2 through the CT core 20. Each test pulse is configured to produce an output from CT1 secondary winding W1 which is of sufficient amplitude and duration as to be detected by IC 100 as a residual current fault. For each such test pulse the IC 100 therefore outputs a respective pulse on IC output line 10. Each output pulse from IC 100 turns on SCR1 to initiate the discharge of C7 as previously described.

However, each test pulse also turns on Q2 via resistor R11 which in turn turns off Q4 and thus prevents the sustained discharge of C7, so SOL1 will not normally be deactivated during the automatic test pulses. As soon as SCR1 turns on in response to a test pulse LED1 will light up because of the current path through it from the test pulse generator via R16, D6, SCR1 and Q1. Thus LED1 will flash on and off in sync with the test pulses indicating the correct functioning of the RCD circuit.

SCR1 cathode could go directly to ground, the common connection point of the circuit. The provision of Q1 facilitates the automatic termination of the test pulse when SCR1 is turned on. This in turn will turn off LED1 and Q2 and restore the positive bias to Q4. Under normal conditions the resultant ON time of LED1 will be relatively short due to the truncated test pulses, and the user will become familiar with the pattern of short pulses at regular intervals.

Thus the automatic test circuit verifies the correct operation of the detecting circuit, provides indication of the occurrence of each test pulse, provides indication of the successful detection of each test pulse, and automatically terminates the test pulse on each successful detection.

If SCR1 and Q1 do not turn on, for example because the detecting circuit IC100 or another vital circuit component is faulty, the test pulse will be sustained to its full duration and will cause capacitor C8 to acquire a charge via R16, LED1, ZD1 and R4. When C8 acquires sufficient charge, which may occur after one or more test pulses as desired, SCR2 will turn on and cause C7 to discharge via R10 and LED2 and thereby cause SOL1 to deactivate and automatically open the contacts SW1 and disconnect the load. The self test circuit will thus automatically disable the RCD in the event of failure of the detecting circuit. LED2 will remain lit to indicate an "end of life" condition, and the LED 1 will remain lit for the full duration of the test pulse. The lighting of LED2 and the longer ON time of LED1 will indicate to the user that an abnormal condition exists. R14 is a bleed resistor to prevent C8 holding a charge indefinitely.

The user may operate the reset switch SW2 to reclose the load contacts, but the contacts will again open automatically in response to the failure of the detecting circuit to detect the test pulses.

It can be arranged for the automatic test circuit to function by omitting Q2 and connecting SCR1 cathode to ground. In this case the test pulses will not be truncated but will be of a fixed duration. In that case it will be necessary to ensure that C8 cannot acquire sufficient charge from a single test pulse to cause SCR2 to turn on and inadvertently indicate an abnormal state.

If the pulse generating circuit fails for any reason, the automatic test function will no longer be operational.

The non-flashing of LED1 will indicate that the automatic test circuit is not operating. In this event the user should operate the manual test to ascertain if the RCD is still operating correctly or not. If the RCD is operating correctly, the contacts will open in response to the manual test as previously described. If the RCD does not open automatically in response to the manual test current, resistor R5 will provide a current to charge capacitor C8 via D3, ZD1 and R4. When the charge on C8 reaches a certain level SCR2 will turn on and cause SOL1 to deactivate. LED2 will light up and remain lit to indicate the end of life condition. The user may operate the reset switch SW2 to reclose the contacts and turn LED2 off, and may decide to continue to use the device to maintain continuity of supply, but each subsequent operation of the test switch will result in automatic tripping and illumination of LED2 to indicate the End of life condition.

Figure 11:
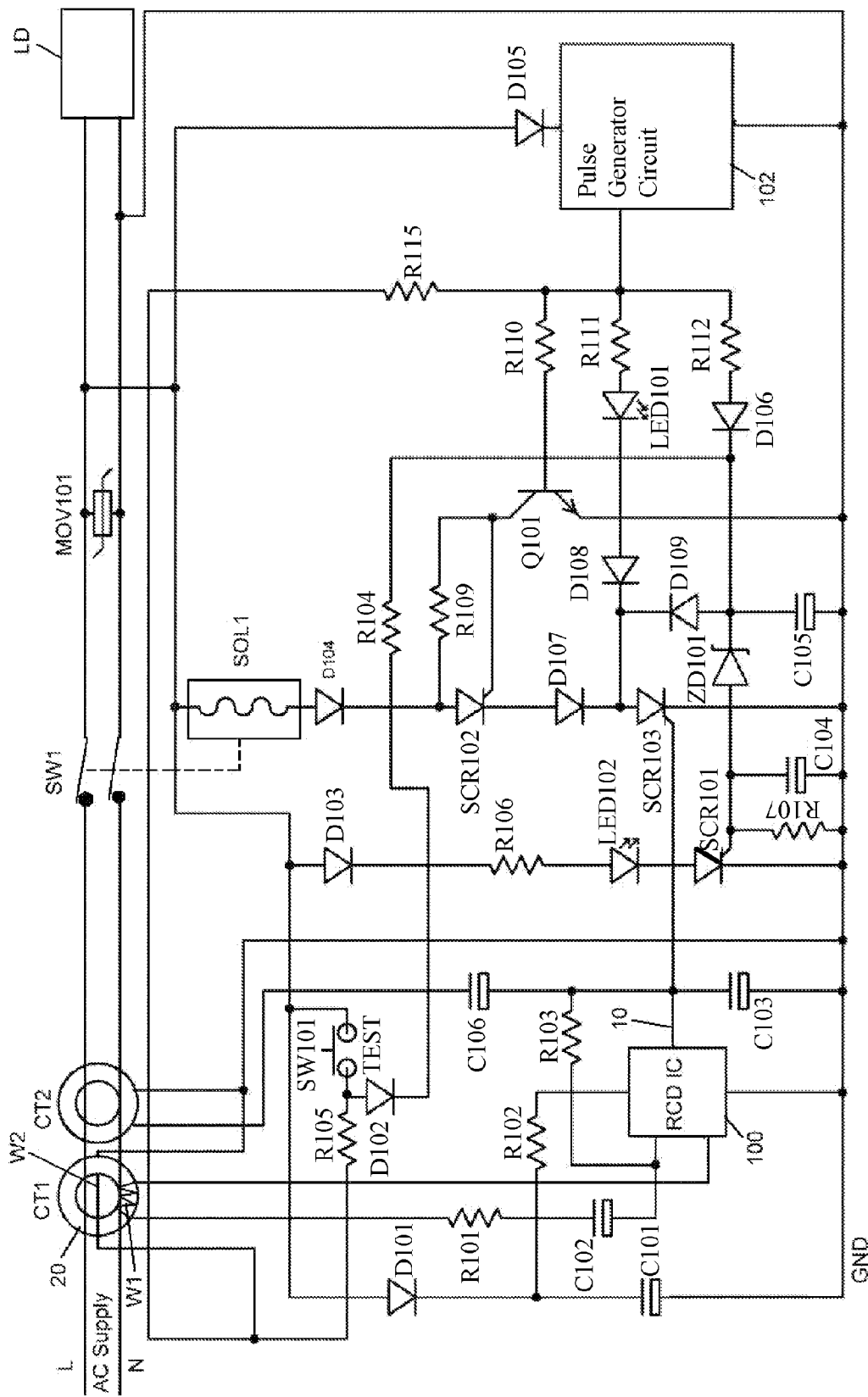

FIG. 11 shows an embodiment of a mechanically latched RCD. In this case the load contacts SW1 are held mechanically latched closed, and will be opened by a sufficiently large current flowing in the coil SOU.

A supply is provided to RCD IC 100 via diode D101 and resistor R102. This supply is smoothed by capacitor C101 and by a voltage regulator in IC 100. As before, the live and neutral conductors L, N of the AC mains supply pass through the toroidal core 20 of a current transformer CT1 en route to a load LD, and the mains supply is also fed to the load LD via a pair of load contacts SW1 controlled by a solenoid coil SOU. As stated, the load contacts SW1 are of a type which are maintained closed mechanically, and are opened by a sufficiently high current flowing in the associated solenoid coil SOU.

The conductors L, N constitute primary windings for the current transformer CT1. The output of the current transformer, which appears across the secondary winding W1, is fed via resistor R101 and capacitor C102 to the RCD IC 100.

In the event of a residual current fault, i.e. a differential current above a predetermined threshold, IC 100 will produce an output signal on line 10 to turn on a silicon controlled rectifier SCR103. SCR102 will already be biased on, so a conduction path will be established from live L to common ground through solenoid winding SOL1, diode D104, SCR102, diode D107 and SCR103. The current flowing through SOL1 will be sufficient to open the load contacts SW1 and disconnect the AC supply from the load LD and the RCD circuitry. The contacts SW1 may be reclosed by manual means (not shown).

The circuit is provided with a normally open test switch SW101. When this switch is manually closed a test current will flow from live L to neutral N via the test switch SW101, resistor R105 and winding W2 of CT1. The resultant differential current induced in W1 is fed to IC 100 via resistor R101 and capacitor C102. The test current produces a differential current from W1 which is sufficiently large as to simulate an actual residual current fault, so that IC 100 produces an output on line 10 to turn on SCR103 resulting in opening of the contacts SW1 as before. Thus the test button operation confirms the correct operation of the RCD circuit.

Pulse generating circuit 102 is as described for the EL embodiment of FIG. 10 and is shown in block form for convenience. The test pulses are passed via resistor R115 to ground via CT1 winding W2. Each test pulse is configured to produce an output from CT1 secondary winding W1 which is of sufficient amplitude and duration to be detected by IC 100 as a residual current fault. For each such test pulse the IC 100 therefore outputs a respective pulse on IC output line 10. Each output pulse on line 10 is applied to the gate of SCR103 to enable it to turn on. However, each test pulse also turns on bipolar transistor Q101 which in turn removes a positive bias from SCR102 to turn it off. Thus, despite SCR103 being turned on, current cannot flow through SOL1 and the load contacts SW1 remain closed. Each time SCR103 is turned on, LED101 is lit until the end of the test pulse. The intermittent lighting of lED101 indicates a successful test.

Each test pulse is also fed to C105 via D106 and R112 to enable C105 to acquire a charge. However, each time SCR103 turns on in response to successful detection of a test pulse, C105 is discharged via D109 and SCR103.

If IC 100 fails to produce an output pulse on line 10 in response to a test pulse, for example due to failure of a key component such as CT101 or IC 100, SCR103 will not turn on and LED101 will no longer light up as previously. C105 will continue to charge up on successive pulses until such time as the voltage on C105 exceeds the breakover voltage of ZD101 and causes SCR101 to turn on. This will cause LED102 to turn on and indicate an abnormal or end of life state.

In the configuration of FIG. 11 as shown, SW102 contacts will not open automatically in response to an end of life condition. This may be a desirable response for RCDs installed in a panel to protect a sub-circuit or a complete circuit in an installation. This contrasts with the arrangement of FIG. 10 where an end of life condition resulted in automatic disconnected of the load. In general, EL type devices are used at the end of a circuit and are often referred to as "point of use" devices, so automatic opening of such devices will generally remove power from a single. Automatic opening of a panel mounted device may result in removal of power from several loads, which may cause considerable inconvenience. However, where an ML type device is intended for "point of use" applications, it may be advantageous to provide for automatic disconnection of the supply under an end of life condition. This can be accommodated in several ways by slight modification of FIG. 11. For example, the anode of SCR101 could optionally also be connected to the lower end of solenoid coil SOL1 so that the current through SCR101 flows through SOL1 to automatically open the contacts of SW102. Another option would be to provide SOL1 with a second winding connected only to SCR101 to facilitate opening of the contacts under an end of life condition. Another option would be to have a separate solenoid operated only by SCR101.

In the event of failure of the pulse generating circuit, LED101 will not flash. A user could operate the test button SW101 under this condition, and the contacts of SW102 would open automatically if the IC 100 detecting circuit was functioning correctly. However, if the detecting circuit was not functioning correctly under this condition, manual operation of test switch SW101 would provide a current via D102 and R104 to charge up C104 and thereby cause SCR101 to turn on after a predetermined time, after which LED102 would be lit to indicate end of life. R107 is a bleed resistor for C104.

The automatic truncating of the test pulses as described for FIG. 10 could also be facilitated within the arrangement of FIG. 11, but has been omitted for simplicity.

In the foregoing embodiments each indicator LED (LED1, LED2, LED101 and LED 102) may be replaced or supplemented by a suitable audible indicator.

Preferably LED1 and LED 101 will be green to provide a positive indication of the state of the device whereas LED2 and LED 102 will be RED to indicate a warning of a negative state of the device.

In FIGS. 10 and 11, a respective sound emitting device can be used instead of, or in addition to, each light emitting diode to provide an audible indication that the circuit is operating correctly.

The foregoing has described various means for self testing and automatic end of life disabling of RCDs and AFDs whereby the end of life circuitry verifies the correct operation of the protective device and also verifies the correct operation of the self test circuitry. These means can be applied to mechanically latching and electrically latching protective devices.

It should be noted that the term SOL has been used as an abbreviation for solenoid. However, a permanent magnet relay (PMR) may also be used in all cases where a solenoid has been shown in the various embodiments.

The invention may be applied to single phase or multiphase AC supply systems.

The invention is not limited to the embodiments described herein which may be modified or varied without departing from the scope of the invention.

The invention claimed is:

1. A device for detecting a fault in an AC supply, comprising a circuit for detecting a differential current in the AC supply to the load, said differential current having a characteristic indicative of a type of supply fault to be detected, and providing a corresponding output, said detecting circuit including a current transformer having the AC supply as primary windings and a secondary winding for detecting said differential current, means to disconnect the load from the supply if said output persists for at least a certain period of time, the disconnect means comprising an electromechanical switch comprising a coil controlling normally-closed contacts in the AC supply to the load, said normally-closed contacts referred to herein as load contacts, said electromechanical switch being responsive to said output subsisting for greater than said certain period of time to disconnect the load from the supply by opening the load contacts, and a generator of intermittent test pulses which are applied to a further primary winding of the current transformer, each test pulse having a duration less than said certain period of time and simulating a fault of the said type by causing a differential current, having a characteristic indicative of the said type of fault, to flow in the secondary winding in the absence of an actual supply fault of said type, said detecting circuit providing an output during each said test pulse, and means for providing a visual and/or audible indication in response to the detection of test pulses by the detecting circuit.

2. A fault detecting device as claimed in claim 1, wherein the electromechanical switch is of a kind whose load contacts are normally mechanically latched closed but can be opened by a sufficiently high current flowing through the coil, wherein the device includes first and second mutually parallel circuit branches in series with the coil, wherein during each test pulse the current flowing through the coil flows through the first circuit branch, the first circuit branch including a light emitting device and an impedance which limit the current flowing through the coil to a level insufficient to open the load contacts, and wherein during occurrence of a fault persisting for longer than a certain duration, said certain duration being longer than the duration of a test pulse, the second circuit branch is switched to a relatively low impedance state so that the current through the coil increases to a level sufficient to open the load contacts.

3. A fault detecting device as claimed in claim 2, in which the output of the detecting circuit causes a charge storage device to progressively charge up during the subsistence of said output, wherein the second circuit branch includes a normally-off solid state switch, and wherein when the voltage on the charge storage device reaches a certain level the solid state switch is turned on to provide said relatively low impedance state, the voltage on the charge storage device reaching said certain level only after a period longer than the duration of a test pulse, the charge storage device being discharged after each test pulse.

4. A fault detecting device as claimed in claim 1, wherein the electromechanical switch is of a kind whose load contacts are maintained closed by a holding current flowing through the coil, wherein the device includes first and second mutually parallel circuit branches in series with the coil, wherein each test pulse causes the second circuit branch to switch from a relatively low impedance state to a relatively high impedance state for the duration of the test pulse so as to divert current through the first circuit branch and reduce the current flow through the coil to below the holding current, the duration of the test pulses being less than the response time of the electromagnetic switch.

5. A fault detecting device as claimed in claim 1, including further means for causing the electromechanical switch to open the load contacts if said detecting circuit fails to provide an output in respect of said test pulses.

6. A fault detecting device as claimed in claim 5, said further means including a further charge storage device which is progressively charged up in periods between test pulses but discharged each time the detection circuit provides an output in response to a test pulse, the voltage on the further charge storage device being applied to a further solid state storage device and wherein when the voltage on the further charge storage device reaches a certain level the further solid state switch changes state, the voltage on the further charge storage device reaching said certain level only after a period longer than the period between test pulses and the charge storage device being discharged upon the occurrence of each test pulse, the device further including means for opening the load contacts when the further solid state switch changes state.

7. A fault detecting device as claimed in claim 5, said further means including a further charge storage device which is connected for being progressively charged up by the test pulses but being discharged each time the detection circuit provides an output in response to a test pulse, the voltage on the further charge storage device being applied to a further solid state switch and wherein when the voltage on the further charge storage device reaches a certain level the further solid state switch changes state, the voltage on the further charge storage device reaching said certain level only if the detection circuit fails to provide an output in response to the test pulses, the device further including means for opening the load contacts when the further solid state switch changes state.

8. A fault detecting device as claimed in claim 1, wherein the fault to be detected is a residual current fault.

9. A fault detecting device as claimed in claim 1, wherein the fault to be detected is an arc fault.

10. A device for detecting a fault in an AC supply, comprising a circuit for detecting a differential current in the AC supply to the load, said differential current having a characteristic indicative of a type of supply fault to be detected, and providing a corresponding output, said detecting circuit including a current transformer having the AC supply as primary windings and a secondary winding for detecting said differential current, means to disconnect the load from the supply if said output persists for at least a certain period of time, the disconnect means comprising an electromechanical switch comprising a coil controlling normally-closed contacts in the AC supply to the load, said normally-closed contacts referred to herein as load contacts, said electromechanical switch being responsive to said output subsisting for greater than said certain period of time to disconnect the load from the supply by opening the load contacts, and a generator of intermittent test pulses which are applied to a further primary winding of the current transformer, each test pulse having a duration less than said certain period of time and simulating a fault of the said type by causing a differential current, having a characteristic indicative of the said type of fault, to flow in the secondary winding in the absence of an actual supply fault of said type, said detecting circuit providing an output during each said test pulse, said disconnect means being arranged to disconnect the load if said detecting circuit fails to provide an output in response to said test pulses.

11. A fault detecting device as claimed in claim 10, wherein the detecting circuit comprises a circuit for detecting a differential current in the AC supply to the load, said differential current having a characteristic indicative of a type of supply fault to be detected, and providing a corresponding output, the disconnect means comprises an electromechanical switch comprising a coil controlling normally-closed contacts in the AC supply to the load (said normally-closed contacts referred to herein as load contacts), said electromechanical switch being responsive to said output subsisting for greater than a certain period of time to disconnect the load from the supply by opening the load contacts, the generator generates said intermittent test pulses each simulating a fault of the said type by causing a differential current, having a characteristic indicative of the said type of fault, to flow in said detecting circuit in the absence of said supply fault, said detecting circuit providing an output during each said test pulse, the duration of each test pulse being less than said certain period of time, and said disconnect means further comprises means for causing the electromechanical switch to open the load contacts if said detecting circuit fails to provide an output in respect of said test pulses.

12. A residual current device comprising:
a circuit for detecting a differential current in an AC supply to a load arising from a residual current fault and providing a corresponding output, said detecting circuit including a current transformer having the AC supply as primary windings and a secondary winding for detecting said differential current,
an electromechanical switch comprising a coil controlling a set of contacts in the AC supply to the load, the load contacts normally being maintained closed in the absence of a residual current fault, an output from the detecting circuit sufficiently changing the current flow in the coil to cause the load contacts to open, if said output persists for at least a certain period of time, and
a generator of intermittent test pulses which are applied to a further primary winding of the current transformer, each test pulse having a duration less than said certain period of time and simulating a residual current fault by causing a differential current simulating a residual current fault to flow in the secondary winding in the absence of an actual residual current fault such that the detecting circuit provides an output in respect of each test pulse,
wherein the device includes means operative in respect of each test pulse to prevent said output causing a sufficient change in the current flowing in the coil so that the load contacts are maintained closed in respect of the test pulse.

13. A residual current device as claimed in claim 12, wherein the electromechanical switch is of a kind which requires a sufficiently high level of current to flow in the coil to maintain the load contacts closed, the device including means providing said sufficiently high level of current in the absence of a residual current fault, and a current path in parallel with the coil and including a first switching device which is normally off in the absence of a residual current fault, an output from the detecting circuit turning the first switching device on to divert current from the coil through the current path so that the current through the coil falls below said sufficiently high level to cause the load contacts to open, wherein the current path includes a second switching device which is normally on but which is turned off by each test pulse so that insufficient current is diverted from the coil whereby the current through the coil does not fall below the sufficiently high level.

14. A residual current device as claimed in claim 13, further including means for providing a visual and/or audible indication each time the first switching device is turned on.

15. A residual current device as claimed in claim 14, wherein the indication means is connected in series with the first switching device in a second current path, the test pulses also being supplied to the second current path such that the indicating means is activated each time the first switching device is turned on.

16. A residual current device as claimed in claim 13, further including means for truncating each test pulse when the first switching device turns on.

17. A residual current device as claimed in claim 16, wherein if due to a faulty RCD the first switching device does not turn on in response to the test pulses, the test pulses are not truncated and the circuit includes a normally-off third switching device which is turned on by the un-truncated test pulses, the third switching device diverting current from the coil so that the current through the coil falls below the necessary level.

18. A residual current device as claimed in claim 17, wherein a charge storage device is charged up by one or more of the un-truncated test pulses and turns on the third switching device when the voltage on the charge storage device reaches a certain level.

19. A residual current device as claimed in claim 12, wherein the electromechanical switch is of a kind whose load contacts are normally mechanically latched closed but are opened by a sufficiently high level of current flowing in the coil, the device including a current path including the coil in series with a first switching device which is normally turned off in the absence of a residual current fault, an output from the detecting circuit turning the first switching device on to allow a current flow in the coil which is of sufficiently high level to open the load contacts, and wherein the current path includes a second switching device which is normally on but which is turned off by each test pulse so that said sufficiently high level of current cannot flow in the coil and the load contacts remain closed.

20. A residual current device as claimed in claim 19, further including means for providing a visual and/or audible indication each time the first switching device is turned on.

21. A residual current device as claimed in claim 20, wherein the indication means is connected in series with the first switching device in a second current path, the test pulses also being supplied to the second current path such that the indicating means is activated each time the first switching device is turned on.

22. A residual current device as claimed in claim 19, wherein the test pulses are applied to a charge storage device which is discharged each time the first switching device is turned on, and wherein if due to a faulty RCD the first switching device does not turn on in response to the test pulses the charge storage device is charged up by the test pulses sufficiently to turn on a third switching device which causes activation of a further indicating means.

* * * * *